United States Patent [19]
Shin et al.

[11] Patent Number: 5,524,070
[45] Date of Patent: Jun. 4, 1996

[54] LOCAL ADAPTIVE CONTRAST ENHANCEMENT

[75] Inventors: Yong-Chul Shin, Amherst; Ramalingam Sridhar, East Amherst; Sargur N. Srihari, Williamsville; Victor Demjanenko, North Tonawanda, all of N.Y.

[73] Assignee: The Research Foundation of State University of New York, Amherst, N.Y.

[21] Appl. No.: 290,173

[22] Filed: Aug. 15, 1994

Related U.S. Application Data

[63] Continuation of Ser. No. 958,075, Oct. 7, 1992.

[51] Int. Cl.$^6$ .................................................. G06K 9/40
[52] U.S. Cl. ........................... 382/274; 382/272; 382/263
[58] Field of Search .................................. 382/27, 18, 54, 382/51, 50, 52, 41, 254, 266, 261, 263, 274, 272

[56] References Cited

U.S. PATENT DOCUMENTS

| | | | |
|---|---|---|---|
| 4,571,635 | 2/1986 | Mahmoodi et al. | 382/54 |
| 4,724,544 | 2/1988 | Matsumoto | 382/27 |
| 4,761,819 | 8/1988 | Denison et al. | 382/54 |
| 4,941,190 | 7/1990 | Joyce | 382/54 |
| 5,081,692 | 1/1992 | Kwon et al. | 382/41 |
| 5,113,454 | 5/1992 | Marcantonio et al. | 382/27 |
| 5,195,175 | 3/1993 | Kanno et al. | 382/58 |

OTHER PUBLICATIONS

Paul W. Palumbo et al., "Document Image Binarization: Evaluation of Algorithms", *Applications of Digital Image Processing IX*, SPIE vol. 697 (1986).
H. B. Barlow et al., "Human Contrast Discrimination and the Threshold of Cortical Neurons", *J. Opt. Soc. Am. A*, vol. 4 No. 12, pp. 2366–2371, Dec. 1987.
M. Vaezi et al., "Contrast–Dependent Spread Filters", SPIE vol. 1244 Image Processing Algorithms and Techniques (1990), pp. 100–107.
A. R. Ganesan et al., "Simple Image Processing Techniques for the Contrast Enhancement of Real–time Digital Speckle Pattern Interfermetry Fringes", *Optical Engineering*, Sep. 1989, vol. 28, No. 9, pp. 1019–1022.

Brhram Javidi, et al., "Image Enhancement by Nonlinear Signal Processing", *Applied Optics*, vol. 29, No. 32, Nov. 1990, pp. 4812–4818.
Jorge L. C. Sanz et al., "Note on Contrast Measures and Polynomial Classifiers", *Proceedings of the IEEE*, vol. 76, No. 3, Mar. 1988, pp. 294–296.
J. M. White, et al., "Image Thresholding for Optical Character Recognition and Other Applications Requiring Character Image Extraction", *IBM J. Res. Develop.*, vol. 27, No. 4, Jul. 1983, pp. 400–411.
Paul W. Palumbo et al., "Document Image Binarization: Evaluation of Algorithms", *Application of Digital Image Processing IX*, SPIE vol. 697 (1986).
H. B. Barlow et al., "Human Contrast Discrimination and the Threshold of Cortical Neurons", *J. Opt. Soc. Am. A*, vol. 4, No. 12, pp.2366–2371, Dec. 1987.
M. Vaezi et al., "Contrast–Dependent Spread Filters", SPIE vol. 1244 Image Processing Algorithms and Techniques (1990), pp. 100–107.
A. R. Ganesan et al., "Simple Image Processing Techniques for the Contrast Enhancement of Real–time Digital Speckle Pattern Interfermetry Fringes", *Optical Engineering*, Sep. 1989, vol. 28, No. 9, pp. 1019–1022.
Brhram Javidi, et al., "Image Enhancement by Nonlinear Signal Processing", *Applied Optics*, vol. 29, No. 32, Nov. 1990, pp. 4812–4818.
Jorge L. C. Sanz et al., "Note on Contrast Measures and Polynomial Classifiers", *Proceedings of the IEEE* vol. 76, No. 3, Mar. 1988, pp. 294–296.
J. M. White, et al., "Image Thresholding for Optical Character Recognition and Other Applications Requiring Character Image Extraction", *IBM J. Res. Develop.*, vol. 27, No. 4, Jul. 1983, pp. 400–411.

*Primary Examiner*—Leo Boudreau
*Assistant Examiner*—David R. Anderson
*Attorney, Agent, or Firm*—Nixon, Hargrave, Devans & Doyle

[57] ABSTRACT

In a mail sorting system 10, output pixel intensities of an optical scanner 18 have their contrast locally enhanced. A contrast enhancer 24 uses statistical methods (averaging, standard deviation) coupled with empirical stretch and offset data stored in a ROM 25, to enhance pixel contrast in a pipelined processing operation.

27 Claims, 6 Drawing Sheets

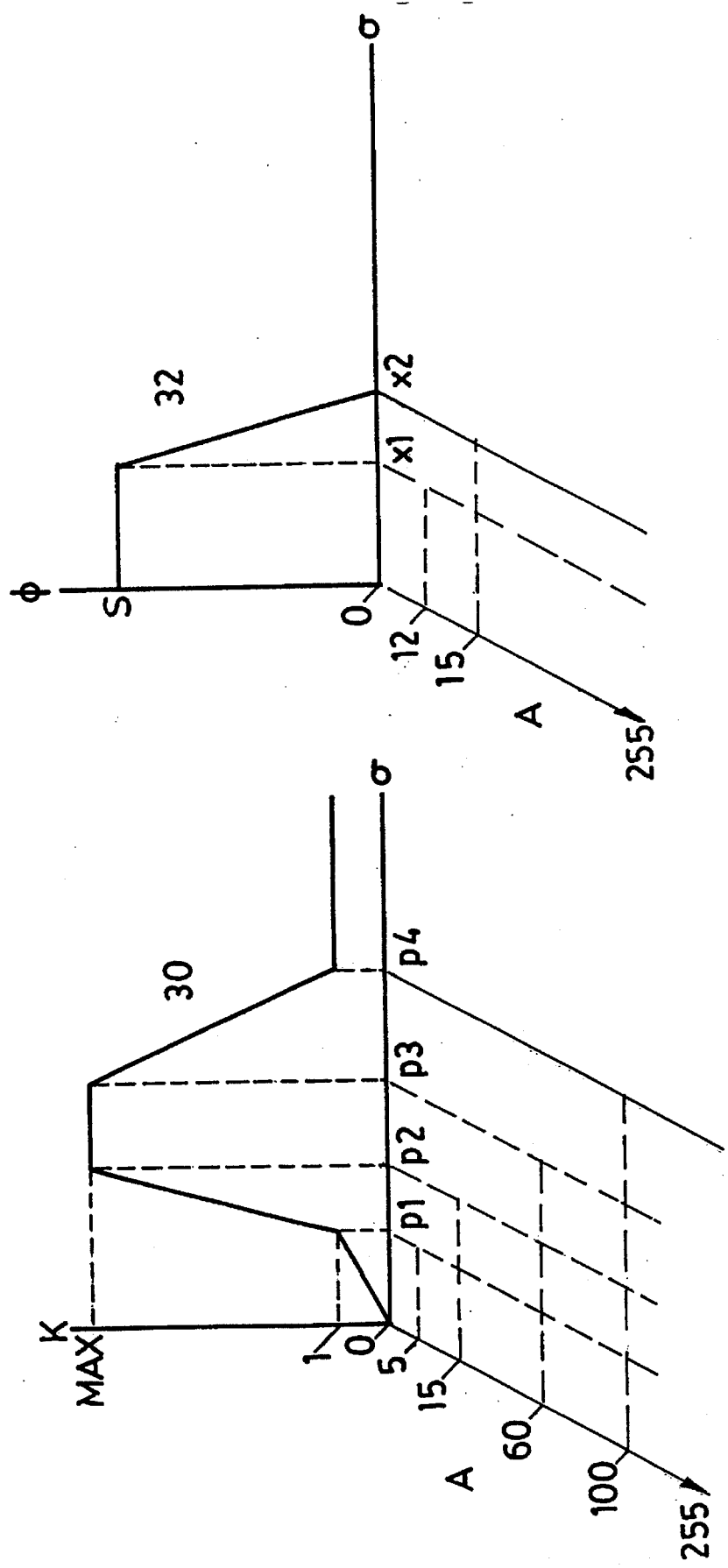

LOCAL ADAPTIVE CONTRAST ENHANCEMENT

The United States Postal Service has rights in this invention pursuant to Contract No. 104230-92-H-3768.

This application is a continuation of application Ser. No. 07/958,075, filed Oct. 7, 1992.

BACKGROUND OF THE INVENTION

The present invention generally relates to a method, apparatus, and device (or integrated circuits) for recognizing and displaying written characters, and, in particular, for local adaptive enhancement of contrast between foreground characters and background character-bearing media, such as envelopes.

Optical character recognition systems are well known. A system with the capability for recognizing handwritten characters is shown and disclosed in U.S. Pat. No. 5,058,182. Such systems generally employ an optical scanner for providing a gray scale image of the obverse side of an envelope containing a return address block and a destination address block. Such a system transforms the image of an envelope into a plurality of pixels, each of which is assigneed a gray level intensity depending upon whether it is background (usually white) or contains foreground (e.g. black, or dark) indicative of a character.

The system quickly separates foreground from background information by establishing a threshold. In a typical character recognition system the gray scale will have 256 levels. A pixel including a character or foreground will have a level at one end of the scale (e.g. at or near zero); white background will have a level at the other end, e.g. 255. So, a threshold level of, for example, 100, can be used to create a binary bit map of the gray scale bit map image. In this way, any pixel with a gray scale value below a certain value is deemed representative of character information and is assigned one binary value, e.g. a "0" (or 1). Pixels with gray level value above the threshold are assigned the other binary value, "1" (or 0) indicative of a white or background area. After the gray scale bit mapped image is so converted into a binary bit mapped image, the information in the binary bit map is further processed in order to recognize characters. After the characters are recognized and interpreted by the system, the envelopes are sorted to one or more collection points for ultimate delivery to addressees. As such, mail may be automatically sorted without the need for human optical inspection and manual handling.

While such systems work well with envelopes made of relatively light colored material and having address characters of relatively dark printing, systems have experienced problems in reliably detecting thresholds where the contrast between the envelope paper and the address characters is less distinct.

A typical problem encountered is termed background degradation. Background degradation occurs where the envelope is of a relatively dark color, for example, red, blue or green. Such dark colored envelopes are frequently used during holiday times and on a variety of greeting cards. Another problem experienced is foreground degradation. Foreground degradation occurs when the printed character has faint foreground strokes, for example, in dot matrix printouts having an outdated ink ribbon. Also, the last page of a set of copies such as carbon copies can produce foreground pixels with relatively high gray levels. When the image is degraded, dark backgrounds processed through the optical scanner are assigned lower than desired gray scale values and foreground features may receive higher than desire gray scale values. As the gray scale values approach each other, the system is less reliable in determining the threshold value, and hence in distinguishing between foreground and background pixels.

SUMMARY OF THE INVENTION

A method and apparatus are provided for enhancing the contrast of an image containing foreground and background portions, in particular, an image having degraded foreground or degraded background portions or both. An optical scanner scans the image and provides an output signal indicative of the gray scale intensities of the pixels of the scanned image. These gray scale intensities are pipelined processed to enhance contrast. The invention receives a stream of gray scale pixel data. The pixels are selectively collected to define a window of pixels, with one pixel at the center of the window. The invention calculates the average intensity of the window and the standard deviation of intensities in the window. In accordance with the results of that calculation, the gray scale intensity of the center pixel may be altered to enhance contrast. The altered center pixel data is then output for further system processing, including thresholding, analysis, and other operations.

The contrast enhancement provided for by this invention is based upon a non-linear mapping of the pixel intensities. This non-linear mapping is based upon the average intensity, A, of pixels in a window of pixels and the standard deviation, $\sigma$, of the pixel intensities in the window. The preferred embodiment uses a 9×9, 81 pixel window, such window defining the area over which the average intensity is measured. Depending upon the average intensity and standard deviation, the gray scale intensity of the center pixel is altered to enhance its contrast.

In accordance with an aspect of the invention, the average intensity of a 9×9 window is computed along with the standard deviation of the pixels within the 9×9 window. If the standard deviation for a window is much greater than zero, that indicates a large, well distributed population of various gray scale intensities. Such is the definition of a high contrast system and as such generally presents little or no problem. However, if the standard deviation is relatively small or almost zero, then contrast enhancement is usually required.

In the case where the standard deviation of the pixel intensity over a 9×9 window is small, it is desirable to stretch the distribution of the gray scaled intensities. Stretching is the statistical alteration of the intensities of the pixels in a window to expand the distribution of pixel values over a larger range of values. Stretching intensifies the contrast. If the standard deviation is equal to or close to zero, the window could be a dark background or a large foreground feature. Contrast is enhanced by adding an offset to the center pixel. Offsetting is the addition of a predetermined amount of intensity to each pixel in a window in order to increase or brighten the intensity of each pixel. Stretch and offset are each a function of average intensity and standard deviations. The amount of stretch and offset applied to a pixel is determined empirically and is applied based upon a piece-wise linear model.

The invention is practiced using well known apparatus and techniques including an optical scanner, a central processing unit, and suitable software for operating the central processing unit in accordance with the statistical criteria of the invention. In a preferred embodiment of the invention, a chip set of two or more application specific integrated circuits (ASICs) are provided. The contrast enhancing chip set is deemed particularly useful in connection with the computation of squares, sums of squares, and square roots, which calculations are essential to calculating standard deviation.

Accordingly, the principal object of the invention is to provide an improved method, apparatus and device for local adaptive contrast enhancement. It is another object of this invention to piece-wise linearly modify the gray scale data of an image in order to locally enhance contrast.

It is the further object of this invention to provide an improved system, method and apparatus to locally enhance the contrast of an image prior to threshold detection by an image processing system.

Yet another object of this invention is to provide, an improved system for contrast enhancement with application specific integrated circuits adapted for linear piece-wise modification of gray scale pixel data of an image.

The above objects and summary will be more fully understood with reference to the attached drawings and the following detailed description.

BRIEF DESCRIPTION OF THE DRAWINGS

FIG. 3a is a piece-wise linear model for implementing stretch.

FIG. 3b is a piece-wise linear model for implementing offset.

DETAILED DESCRIPTION

Figure 1:
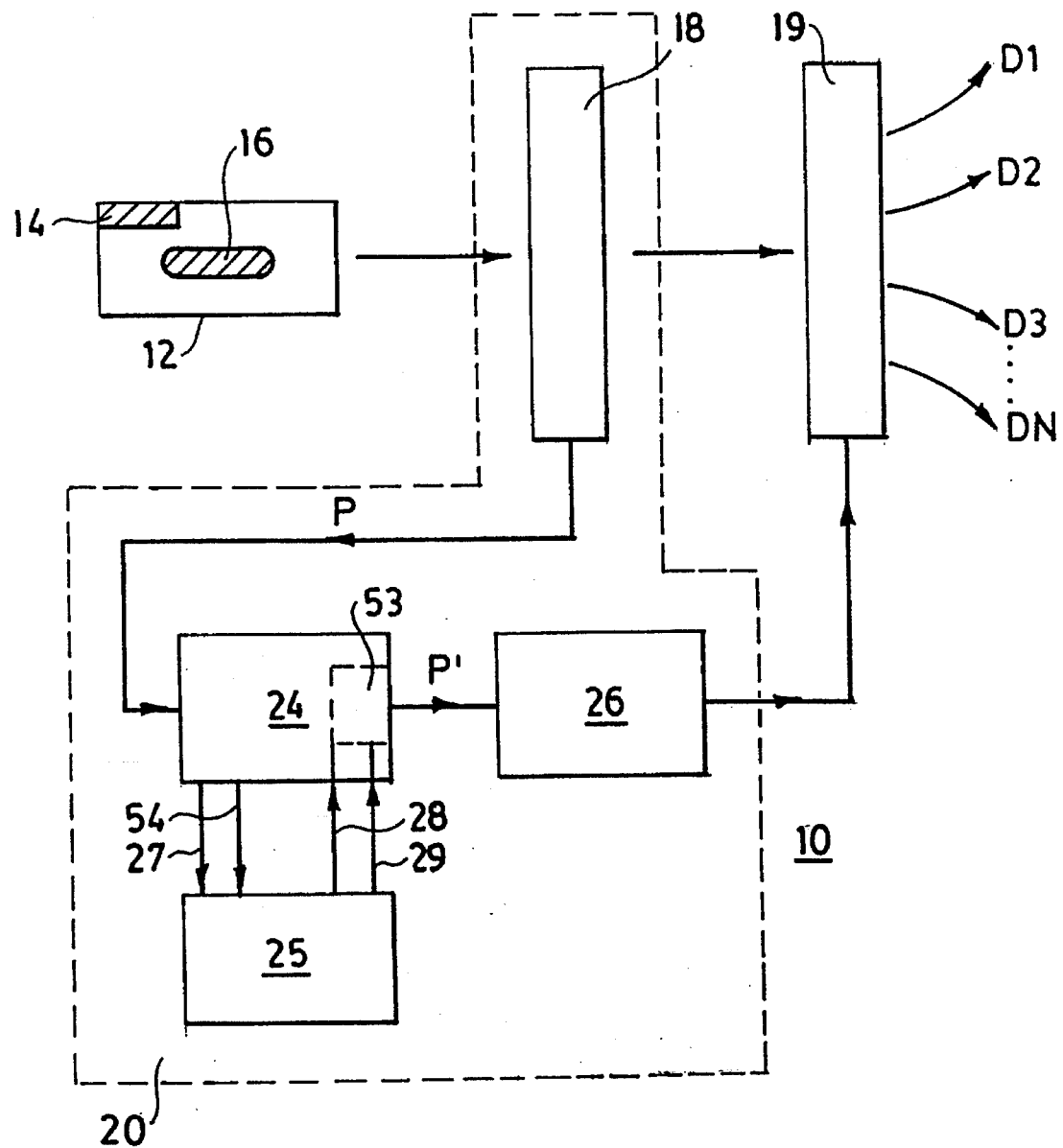
FIG. 1 is a block diagram a mail sorting system incorporating features of this invention.

Turning to the drawings, FIG. 1 shows a sorter system 10. The sorter system 10 directs a letter 12 or other piece of mail via a sorting machine 19 to one of many delivery destinations D1, D2, D3, . . . DN. This function is generally accomplished by passing the letter 12 through a scanner 18. The scanner 18 is capable of optically scanning the surface of the letter 12 and digitizing the data found on that surface. This data includes data found in the return address block 14 as well as the destination address block 16 of the letter.

The scanner 18 is part of an image processing system 20. Any suitable scanner may be used, for example, a vision or CCD camera whose output is coupled to an analog-to-digital converter for generating a series of gray scale pixel intensity data signals. The scanner divides an image into a series of pixel elements and generates data representative of a gray scale intensity, P, of each pixel. The intensity of each pixel is input to contrast enhancer 24. Contrast enhancer 24 is in communication with a memory 25. The memory 25 may be any suitable type, preferably a read only memory (rom) that contains enhancement factors for selected standard deviations and average intensities. Address lines 27 and 54 carry the standard deviation address and the average intensity address to rom 25, respectively. In tom 25, certain enhancement factors, stretch (K) and offset ($\phi$) are stored at the standard deviation and the average intensity address locations. In response to an addressed location, rom 25 outputs the enhancement factors K and $\phi$ via lines 28, 29, respectively, to contrast enhancer 24. Contrast enhancer 24 applies the enhancement factors K, $\phi$ to the input gray scale intensity of a center pixel, P, and generates an output pixel, P', that corresponds to the input pixel and is enhanced in contrast. Thereafter, the contrast enhanced image is analyzed by analyzer 26 for threshold and character recognition. In response to that analysis, letter 12 is directed by sorter 19 to one of the destinations D1–DN.

Figure 5A:
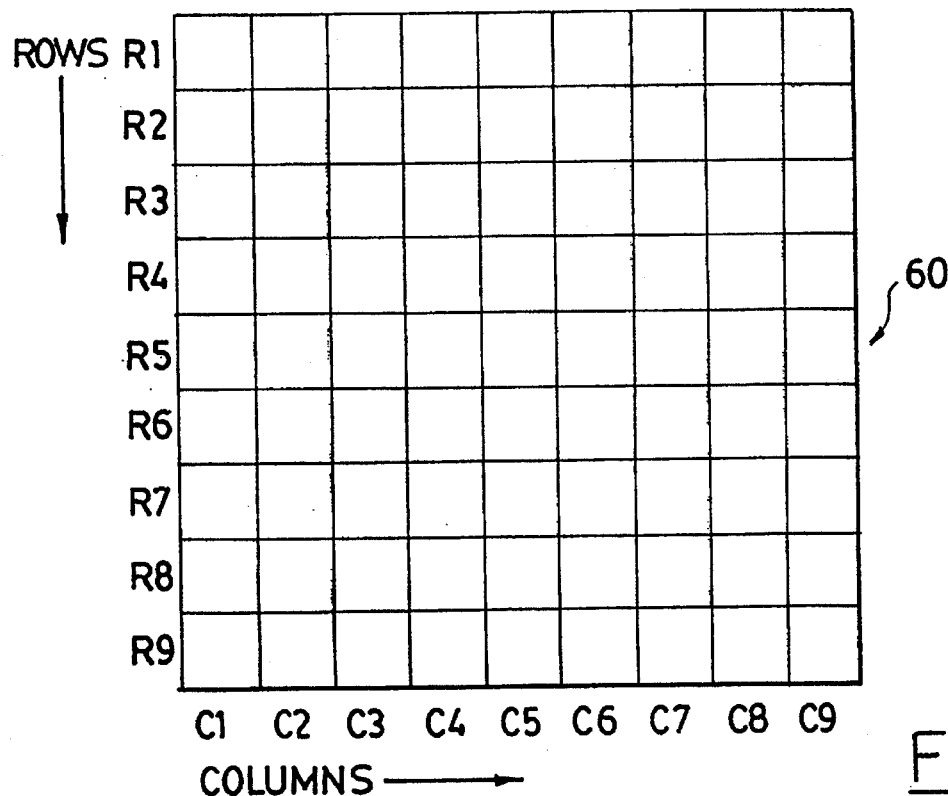
FIG. 5a is a schematic of a 9×9 window.

As a first step in contrast enhancement, the enhancer 24 will select 81 pixels for a 9×9 window, such as the window 60 shown in FIG. 5a, generally beginning in the top left corner of an image and proceed in a step-wise pattern left to right and top to bottom. For each window, the enhancer 24 calculates the average intensity A of the pixels in that window. At the same time, the enhancer 24 calculates the standard deviation, $\sigma$, of the pixels in the window from the average, A. Dependent upon the standard deviation and the average intensity, the enhancer 24 addresses the rom 25 via address lines 27 and 54. The tom 25 outputs stretch, K, and offset, $\phi$, factors to alter the intensity, P, of the center pixel of the window.

Figure 2B:
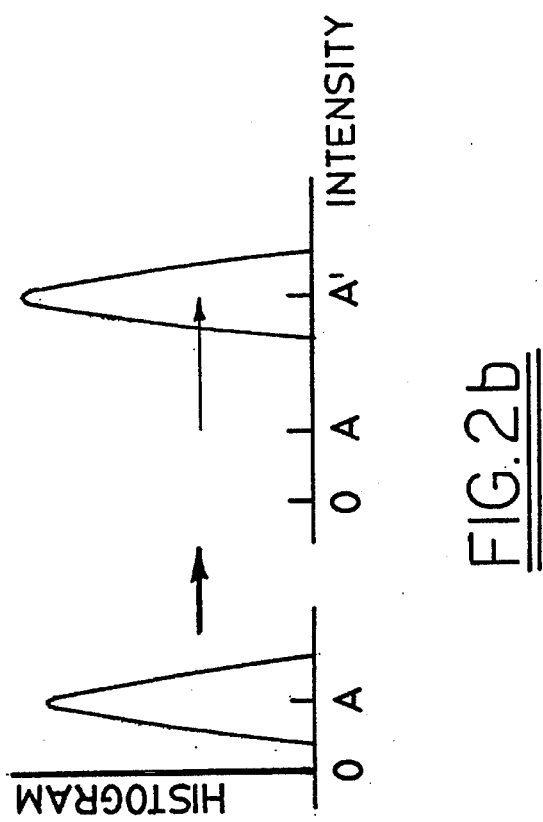
FIG. 2b is a graphical representation of offset of a bit mapped histogram.
Figure 2A:
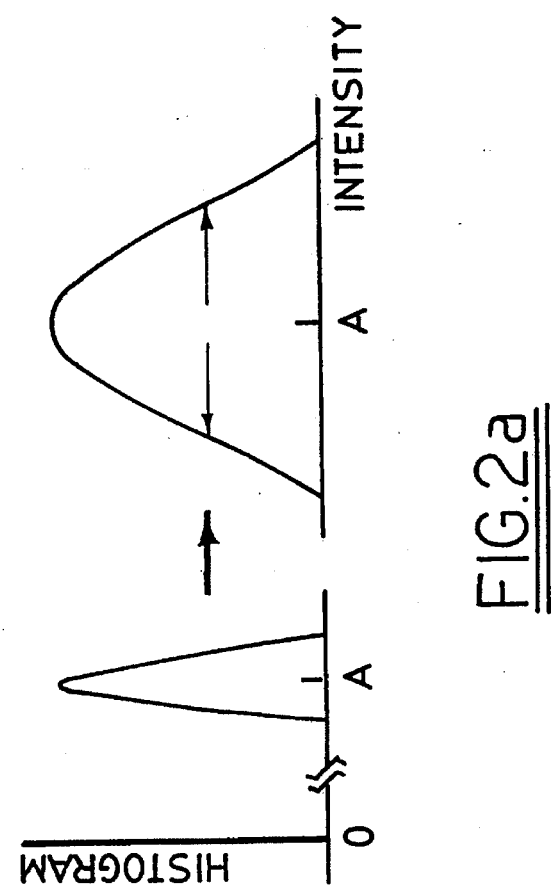
FIG. 2a is a graphical representation of stretching of a bit mapped histogram.

Contrast enhancement using stretch and offset is best explained with reference to FIGS. 2a, b and 3a, b. Stretch is applied if the image has a small distribution ($\sigma$ approximately zero) over a window with a certain average intensity much greater than zero (A>>0). In this situation the distribution can be stretched and the contrast is intensified. FIG. 2a shows an example of a histogram curve 34 of the frequency of intensity values within a window where the standard deviation $\sigma$ from the average A is very small and where the average A is much greater than zero. In such cases, there is little contrast. So, it is desirable to spread out the population of intensities by stretching the histogram to assume a shape 36 such as shown the right hand portion of FIG. 2a.

Another problem occurs if there is a small distribution where the average intensity of the window is at or about zero. In this case, the window could be a dark background or a large foreground feature. In order to enhance the contrast and determine whether it is a background or foreground feature, an offset is added to the center pixel thereby increasing the "brightness" of the pixel. As such a histogram having a shape such as shape 34 shown in FIG. 2b is simply moved to the right by increasing the average intensity from A to A'. The offset function thus brightens the value of a pixel so that the contribution of the pixel will be de-emphasized in later thresholding. The stretch function expands the distribution of pixel values and thus enhances contrast and makes thresholding easier.

In the preferred embodiment of the invention, the stretch, K and the offset, $\phi$, were determined empirically and are shown in FIGS. 3a and 3b. The latter form piece-wise linear functions and are used to transform the center pixel value P to a new value P', based upon different values of K and $\phi$ for different intensity values of P. In particular, it was empirically determined that intensity, P, had four critical points, Y1–Y4 and these points occur, respectively at intensities of 5, 15, 60 and 100 in a gray system having 256 values of intensity. The maximum coefficient of stretch was determined to be 20. For offset, the maximum coefficient of offset, S, was equal to 60. This was a fixed value for intensities up to a first critical point X1, typically, 12 and fell off rapidly to zero as the intensities marginally increased to a typical cut off value of 15. Thus, the curves 30, 32 in piece-wise linear FIGS. 3a, 3b represent empirical determinations of critical points for enhancing contrast. With the critical points Yi and Xi, the overall enhancement is a combination of stretches and offsets as shown in Table 1, below.

TABLE I

| σ | Description |
|---|---|
| 0–5 | Decrease contrast with stretch, k < 1. |
| | Increase intensity with offset, $\phi$ = s. |
| 5–12 | Increase contrast with stretch, 1 < k < max. |
| | Increase intensity with offset, $\phi$ = s. |
| 12–15 | Increase contrast with stretch, 1 < k < max. |
| | Increase intensity with offset, $\phi$ < s. |
| 15–60 | Increase contrast with stretch, k = max. |
| 60–100 | Increase contrast with stretch, 1 < k < max. |
| 100– | No enhancement. |

Based on the definitions of stretch and offset, a non-linear mapping $M(A,\sigma,P)$, where A is the local average, $\sigma$ is the local standard deviation and P is the center pixel over a 9×9 window, is represented by $$P'=M(A,\sigma,P)=kP-A(k-1)+\phi \quad (1)$$

where $0 \leq P' \leq 255$ is the new pixel value.

With fixed values of A and $\sigma$, the mapping can be rewritten as $$P'=\alpha P + B \quad (2)$$

where $\alpha$ and $\beta$ are constants. In other words, the coefficients $\alpha$ and $\beta$, which are determined by A and $\sigma$ as the local features in a 9×9 window, provide the local adaptiveness of the approach.

Figure 6:
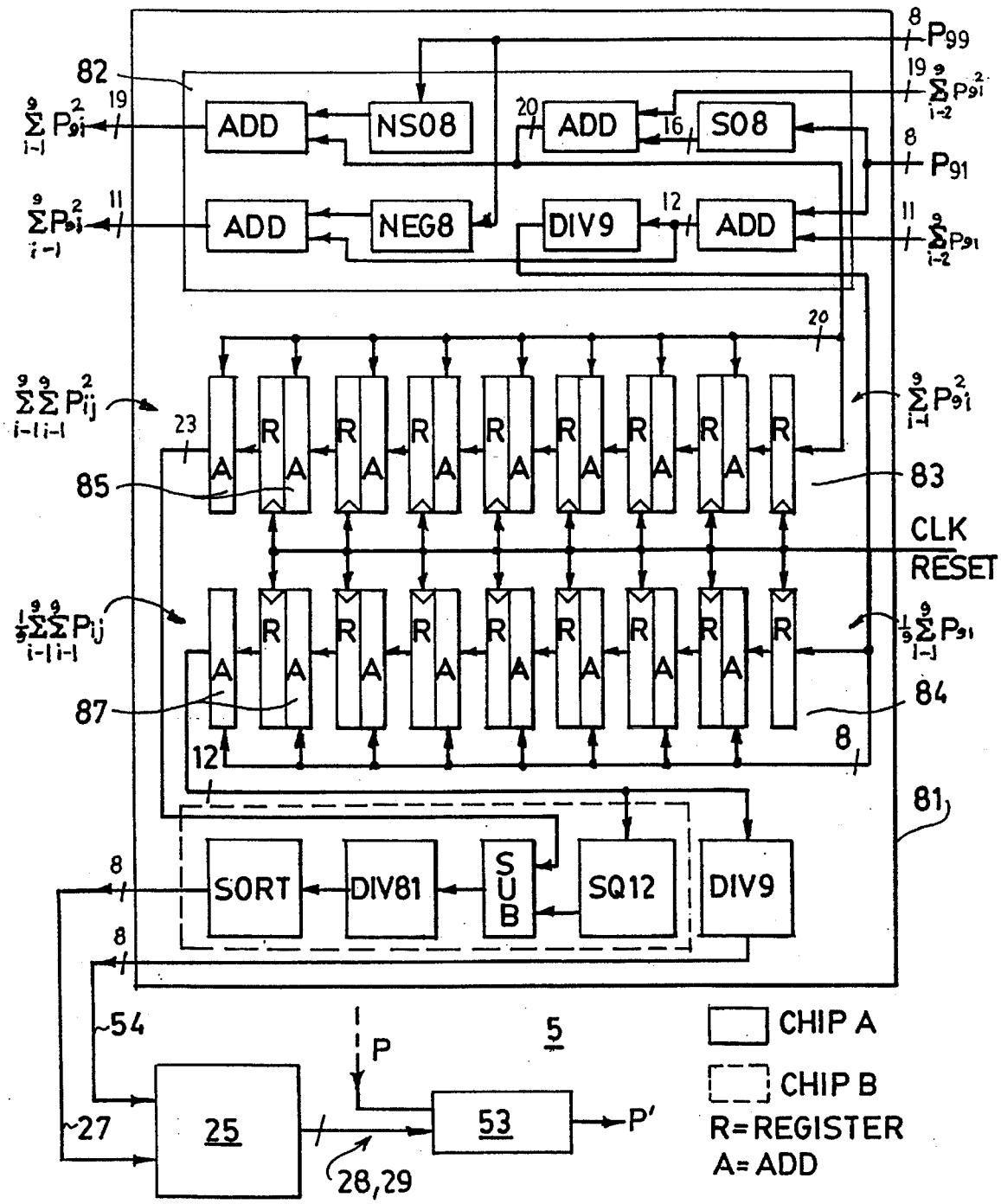
FIG. 6 is a functional block diagram of an application specific integrated circuit chip set incorporating local contrast enhancement features of this invention.

The implementation of equation 1 above is time consuming because as it includes the calculation of standard deviation that requires multiplication and square root operations. In order to reduce the time for these complicated calculations, an ASIC chip set 5 as shown in FIG. 6 is provided with a column-wise dynamic programming method and pipelining for the preferred embodiment. For each column $C_i$ (where i=1, ... 9, $C_1$ and $C_9$ are the left most and the right most columns of the 9×9 window, respectively), the sum of square, $\Sigma P_{ij}^2$ and the square of sum $\Sigma P_{ij}^2$, where j=1 ... , 9 row number are calculated by sum and squaring circuit 50. Since the image is scanned from left to right and from top to bottom, only $\Sigma P_{9j}$ and $\Sigma P_{9j}^2$ need to be calculated at a time. $\sigma$ can thus be computed from $$\sigma = \frac{\sum_{i=1}^{9}\sum_{j=1}^{9} P_{ij}^2 - 1/81\left(\sum_{i=1}^{9}\sum_{j=1}^{9} P_{ij}\right)^2}{81} \quad (3)$$

Figure 5B:
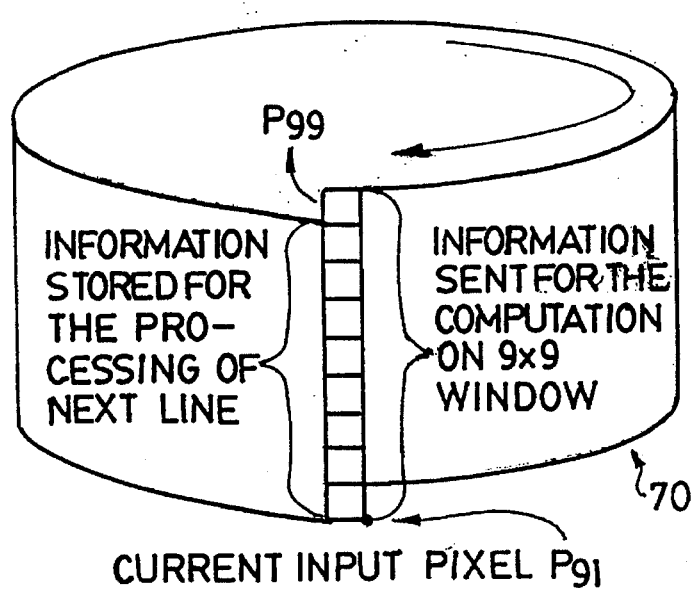
FIG. 5b is a schematic diagram showing a circular queue for holding overlapping pixel information.

The column-wise dynamic operation can be explained by FIG. 5b with a circular queue 70 which stores the statistical information of the overlapping pixels in a column. The size of the queue is determined by the size of an image. At time t, the queue provides $\Sigma_{j=2}^{9} P_{9j}^2$ and $\Sigma_{j=2}^{9} P_{9j}$. The current pixel value $P_{9j}$ is added to obtain the values of $\Sigma_{j=1}^{9} P_{9j}^2$ and $\Sigma_{j=1}^{9} P_{9j}$. By subtracting $P_{99}^2$ and $P_{99}$ from these, one can obtain $\Sigma_{j=1}^{8} P_{9j}^2$ and $\Sigma_{j=1}^{8} P_{9j}$ are stored in the queue and will be used for the computation for the next scan line. The stretch and the offset are implemented using look-up tables with external rom memory 25.

The chip set 5 includes a first ASIC 81 having circuitry 82 for generating the sum of a column of pixel intensity values and the sum of the squares of a column of pixel intensity values. A first set of shift registers 83 holds the sum of the squares of nine columns, A second set of shift registers 84 holds the average intensity value of each of nine columns. A set of adders 85 sums the sum of the squares held by registers 83 and provides one input to a standard deviation calculation ASIC 86. Another set of adders 87 also provides an input to ASIC 86 and to a divide-by-nine divider 88 for calculating the average intensity of the window defined by the nine average column intensities held in registers 84. The output of divider 88 accesses the rom (read only memory) 25 via address lines 54.

A standard deviation calculation ASIC 86 computes $\sigma$ in accordance with the relationship shown above in equation (3). There are a number of square root algorithms useful for calculating standard deviation. In the preferred embodiment, ASIC 86 implements equation (3) using the two-step algorithm described by R. Hashemian, "Square Rooting Algorithm for Integer and Floating-Point Numbers," IEEE Transactions on Computers, vol. 39, pp. 1025–1029, August 1990, which is incorporated herein by reference. The output of ASIC 86 addresses a rom 25 via address lines 27. Based on the addressed standard deviation or average intensity or both, the rom 25 outputs stretch and offset values to new pixel value circuit 53. That circuit 53 implements the algorithm of equation (1) to yield a contrast enhanced pixel intensity value, P'.

Figure 4:
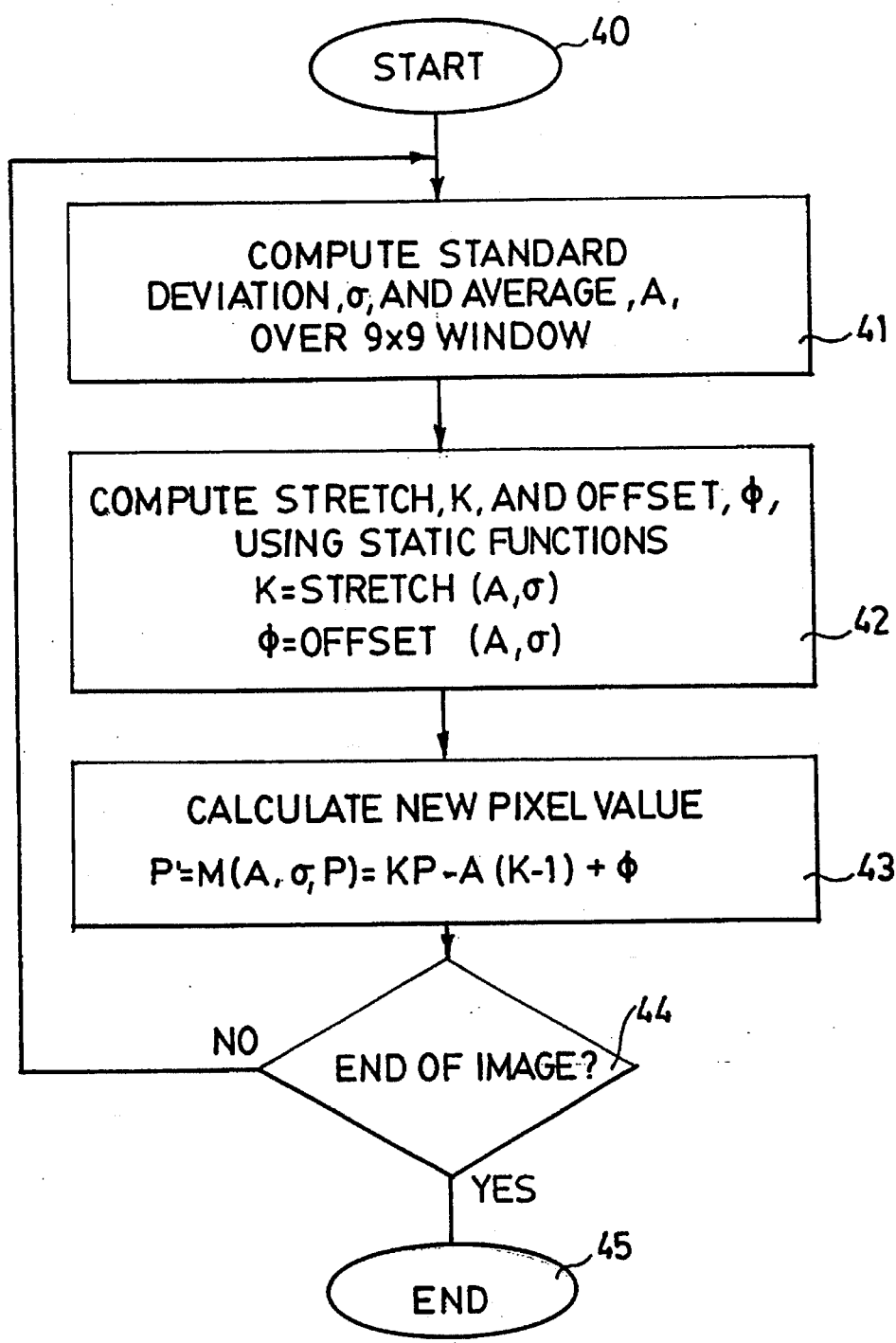
FIG. 4 is a flow chart representing the various steps in a process used to locally enhance contrast of an image.

In operation, ASIC chip set 5 performs the steps indicated in the flow chart of FIG. 4. After a command step 40 to start, the chip set computes the average intensity A and standard deviation $\sigma$ of a 9×9 window as called for in step 41. In the next step 42, stretch, K and offset, $\phi$, are calculated or read from look up tables. The following step 43 is the calculation of the new gray scale pixel value P' as altered by the relationship found in equation 1. At decision step 44, the above process is continuously repeated for each pixel until the whole imaged is processed.

With the above-described invention, gray scale intensity outputs, P, of an optical scanner 18 are quickly processed and experience only a small, latent delay. It is not necessary to store gray scale data and later process it. Instead, the gray scale signals P are pipelined in modified form P' directly to analyzer 26. In the preferred embodiment the center pixel is altered. However, the altered pixel may be any other pixel, so long as it is located near the center of the window chosen for averaging.

ASIC chip set 5 is implemented in two micron CMOS design rules using full custom layout circuits for arithmetic circuits including adders, multipliers, accumulators, registers, and others. Those skilled in the art will understand that a programmed central processing unit could also implement the inventive method of this invention following the flow chart of FIG. 4. However, the ASIC chip set 5 significantly improves the speed of the method. Moreover, the chip set 5 would be reduced in numbers to a single chip set using smaller design rules, e.g. 0.8 microns or less.

Those skilled in the art will further understand that other changes can be made to the preferred embodiment without departing from the spirit and scope of the invention as set forth in the appended claims. For example, one may use a first window of a first number of pixels to compute an average intensity, A, and a second window of a second number of pixels to compute the standard deviation.

Depending upon the particular application, the two windows may overlap. In any case, the intensity value of the pixel in the center of the second window is changed to enhance contrast. The invention is not limited to any one size of window or to windows with odd numbered pixels. One may use, for example, a 4×4 window and apply the average and standard deviation calculations to any pixel near the center of the window.

We claim:

1. A method for enhancing contrast of pixels of an image having foreground and background portions comprising the steps of, scanning the image;

dividing the scanned image into a plurality of pixels;

generating a series of data signals, each signal having an intensity magnitude proportional to the amount of foreground and background in each pixel;

selecting a first number of pixel data signals defining a first window of pixels and a corresponding center pixel in said window;

storing in a memory values for offset and stretch corresponding to predetermined ranges of standard deviation and average intensity;

computing the average intensity and standard deviation of the selected pixel data signals in the window;

accessing said memory to retrieve a stored value of stretch corresponding to a computed standard deviation in a range between zero and approximately zero and corresponding to a computed average intensity in a range much greater than zero;

accessing said memory to retrieve a stored value of offset corresponding to a computed standard deviation in a range between zero and approximately zero and corresponding to a computed average intensity in a range between zero and approximately zero; and selectively changing the intensity magnitude of a pixel data signal for a pixel disposed near the center pixel of said window in accordance with accessed values of offset and stretch.

2. The method of claim 1 further comprising selecting a second number of pixels data signals defining a second window of pixels with at least one pixel of said second window being different from the pixel of the first window;

generating another series of data signals, each signal having an intensity magnitude proportional to the amount of foreground and background in each pixel of said second window;

computing the average intensity of said first window and computing the standard deviation of said second window;

and selectively changing the intensity magnitude of the data signal of the center pixel of the second window.

3. The method of claim 2 wherein both windows have the same center pixel.

4. The method of claim 1 where the changed pixel data signal is the data signal of the center pixel.

5. The method of claim 1 further comprising the step of serially moving the window a distance of one pixel to respectively define new center pixels and new windows and enhancing the contrast of each new center pixel.

6. The method of claim 1 further comprising the step of selectively changing the intensity magnitude of the data signal of the center pixel when the average intensity of the window is in a first range between zero and approximately zero or in a second range much greater than zero, 7. The method of claim 1 further comprising the step of selectively changing the intensity magnitude of the data signal of the center pixel when the standard deviation is in a range between zero and approximately zero.

8. The method of claim 1 wherein the intensity magnitude of the data signal of the center pixel is stretched when the standard deviation is in a range between zero and approximately zero and the average intensity is in a range of much greater than zero.

9. The method of claim 1 wherein the intensity magnitude of the data signal of the center pixel is offset when the standard deviation and average intensity are each in a range between zero and approximately zero.

10. The method of claim 8 wherein the stretch values comprise predetermined amounts for selected ranges of standard deviation and average intensity.

11. The method of claim 9 wherein the offset values comprise predetermined amounts for selected ranges of standard deviation and average intensity.

12. The method of claim 1 wherein the ranges of average intensity overlap.

13. A system for enhancing contrast of pixels of an image having foreground and background portions comprising, an optical image scanner for scanning an image and generating a series of pixel data signals having magnitudes representative of the intensity of each pixel in the image, means the selecting a first number of pixel data signals to define a first window of pixel signals and a corresponding center pixel signal in said window, means for computing the average intensity and standard deviation of the pixel signals of said window, a read-only memory for storing values of offset and stretch corresponding to a predetermined range of standard deviation between zero and approximately zero and predetermined ranges of average intensity, including a first average intensity range between zero and approximately zero and a second average intensity range of much greater than zero, and means for enhancing contrast by selectively changing the intensity of a pixel data signal of a pixel near the center pixel in accordance with the accessed values of offset and stretch.

14. The method of claim 13 further comprising selecting a second number of pixels data signals defining a second window of pixels with at least one pixel of said second window being different from the pixels of said first window;

computing the average intensity of the magnitude of said first window signals and computing the standard deviation of said second window signals;

and selectively changing the intensity of the center pixel data signals of the second window.

15. The method of claim 14 wherein both windows have the same center pixel.

16. The system of claim 13 wherein the changed pixel data signal is the data signal of the center pixel.

17. The system of claim 13 further comprising means for moving the pixel window a distance of one pixel to serially define subsequent new windows.

18. The system of claim 13 wherein said means for selectively changing the center pixel data signal intensity magnitude changes said magnitude when the standard deviation is zero or approximately zero.

19. The system of claim 13 wherein said means for selectively changing the pixel data signal intensity magnitude changes said magnitude when the average intensity is zero or approximately zero or much greater than zero.

20. The system of claim 13 wherein said means for changing the pixel data signal intensity magnitude stretches intensity of the pixel data signal when the standard deviation of the window is zero or approximately zero and the average intensity of the window is much greater than zero.

21. The system of claim 13 wherein said means for changing the pixel data signal intensity magnitude offsets the magnitude of the pixel data signal when the standard deviation is zero or approximately zero and the average intensity is zero or approximately zero.

22. The system of claim 20 wherein the stored stretch values are a predetermined amount for selected ranges of standard deviation and average intensity.

23. The system of claim 21 wherein the stored offset values are predetermined amounts for selected ranges of standard deviation and average intensity.

24. The method of claim 13 wherein the ranges of average intensity overlap.

25. In a system for contrast enhancement of pixel data, a chip set, including a first integrated circuit comprising, an input for receiving data signals representative of pixel intensity, a first circuit for squaring the value of pixel intensity data signals, a second circuit for summing the squared values of pixel intensity data signals, a third circuit for summing the input pixel intensity data signals, a fourth circuit for squaring the sum of input pixel intensity data signals, a plurality of shift registers connected to said second, third and fourth circuit means for receiving data representative of the sum of the input pixel intensity data, the sum of the squares of input pixel intensity data, and the square of the sum of input pixel intensity data, an averaging and standard deviation calculating circuit coupled to the shift registers for computing the average and standard deviation of input pixel intensity data, a second integrated circuit comprising a memory having stored values of offset and stretch, said stored values of offset and stretch being stored in accordance with a range of standard deviation and average intensity, and a third integrated circuit comprising a pixel intensity data alteration circuit coupled to the first and second integrated circuits, for altering the magnitude of the input pixel intensity data signals in accordance with the standard deviation and the average intensity to generate output signals representative of locally contrast enhanced pixel intensity data.

26. The chip set of claim 25 wherein the first and second ranges of average intensity stored in the second circuit overlap.

27. A method for enhancing contrast of pixels of an image having foreground and background portions comprising the steps of, scanning the image;

dividing the scanned image into a plurality of pixels;

generating a series of data signals, each signal having an intensity magnitude proportional to the amount of foreground and background in each pixel;

selecting a first number of pixel data signals defining a first window of pixels and a corresponding center pixel in said window;

storing in a memory values for offset and stretch corresponding to predetermined ranges of standard deviation and average intensity;

computing the average intensity and standard deviation of the selected pixel data signals in the window;

accessing said memory when the computed standard deviation is in a range between zero and approximately zero;

retrieving from said memory a stored offset value when said computed average intensity is in a range between zero and approximately zero;

retrieving from said memory a stored stretch value when said computed average intensity is in a range much greater than zero; and selectively changing the intensity magnitude of a pixel data signal for a pixel disposed near the center pixel of said window in accordance with retrieved value.

* * * * *